United States Patent [19]

Morris

[11] Patent Number: 4,768,542

[45] Date of Patent: Sep. 6, 1988

[54] DRAIN VALVE

[75] Inventor: John M. Morris, Auburn, Wash.

[73] Assignee: GT Development Corporation, Tukwila, Wash.

[21] Appl. No.: 116,500

[22] Filed: Nov. 4, 1987

[51] Int. Cl.[4] .............................................. F16T 1/16
[52] U.S. Cl. .................................... 137/204; 137/494; 137/495
[58] Field of Search ............... 137/204, 508, 107, 494, 137/495

[56] References Cited

U.S. PATENT DOCUMENTS

| 2,041,906 | 5/1936 | Czarnecki | 277/20 |
| 2,125,144 | 7/1938 | Aikmar | 137/204 |
| 2,248,850 | 7/1941 | Campbell | 137/107 X |
| 2,626,655 | 1/1953 | Trautman et al. | 158/36.4 |
| 2,693,821 | 11/1954 | Cornelius | 137/508 |
| 2,958,394 | 11/1960 | Woodmansee | 137/107 X |
| 2,986,159 | 5/1961 | Snyder | 137/493 |
| 3,027,905 | 4/1962 | Dobrikin | 137/102 |
| 3,175,572 | 3/1965 | Kauer et al. | 137/204 |
| 3,311,124 | 3/1967 | Gates et al. | 137/110 |
| 3,498,056 | 3/1970 | Avery | 137/107 X |
| 3,516,430 | 6/1970 | Valentine | 137/204 |

OTHER PUBLICATIONS

Pp. 5 and 6 of Jun. 1, 1977 parts catalogue of Wagner Electric Corporation, Parsippany, N.J.
Packing insert for "Speedaire" TM valve, Model 2Z166, distributed by Dayton Electric Mfg. Co., Chicago, Illinois; distributed prior to Oct. 1984, exact date unknown.

Primary Examiner—Martin P. Schwadron
Assistant Examiner—Stephen M. Hepperle
Attorney, Agent, or Firm—Joan H. Pauly

[57] ABSTRACT

A piston (36) divides the valve interior into a main chamber (38) and a sensing chamber (40). A fixed valve seat (26) sealingly engages the piston (36) to close communication between the chambers (38, 40). The seat (26) is carried by an axial stem (20) which extends through an opening (42) in the piston (36). The valve inlet (14) extends through a passageway (22) in the stem (20) into the main chamber (38). An outlet (28) is formed in the main chamber (38). A valve element (62) closes the outlet (28). When pressure is higher in the main chamber (38) than in the sensing chamber (40), the piston moves toward the sensing chamber (40) to open communication between the chambers (38, 40). When there is a pressure drop in the main chamber (38), the piston (36) moves toward the main chamber (38) to open communication between the chambers (38, 40) and move the valve element (62) into an open position. A flange (46) caried by the piston (36) engages a flange (80) formed on a hat-shaped retainer (72) to which the valve element (62) is attached. The valve (8) preferably has a manual drain lever (88).

16 Claims, 5 Drawing Sheets

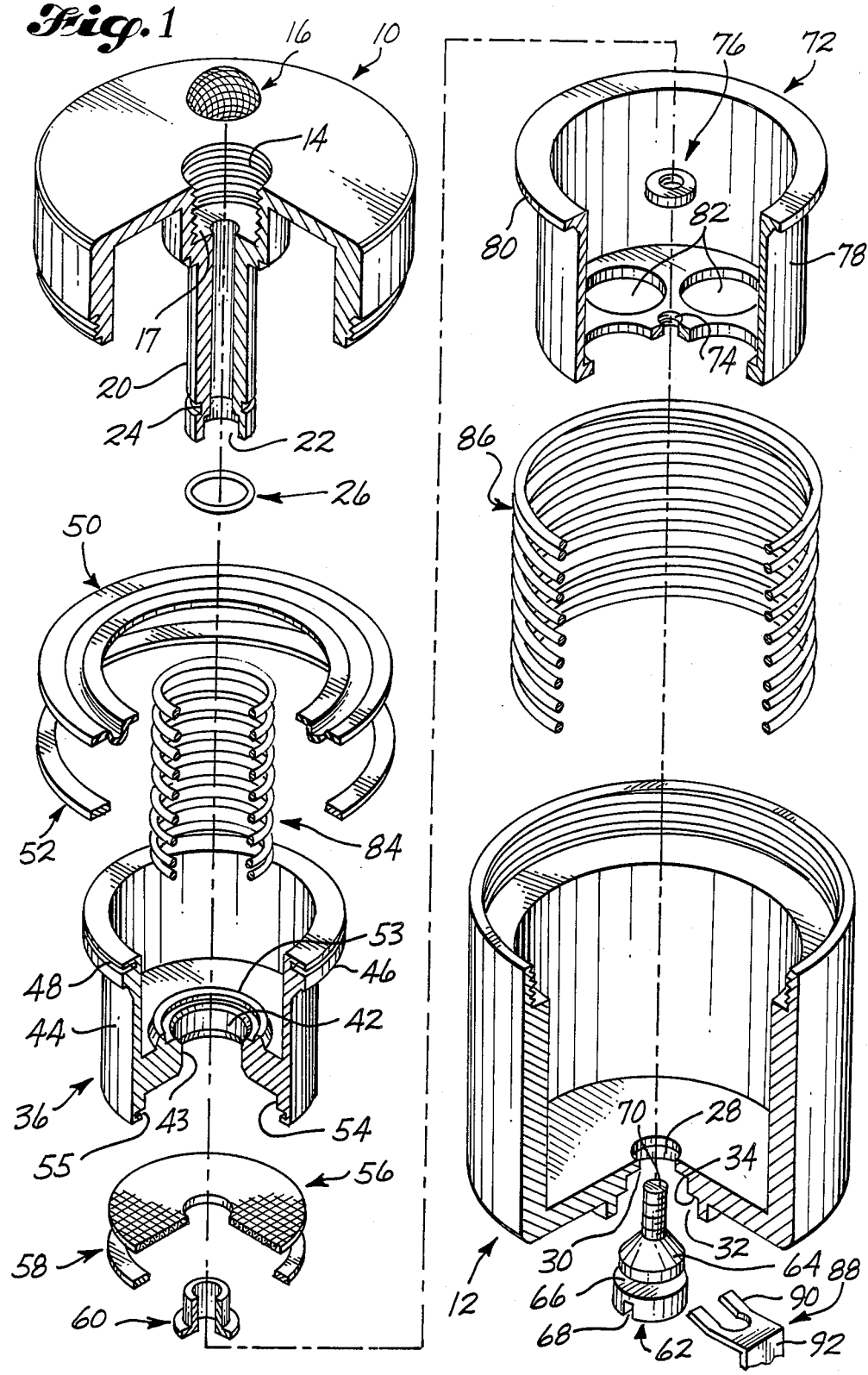

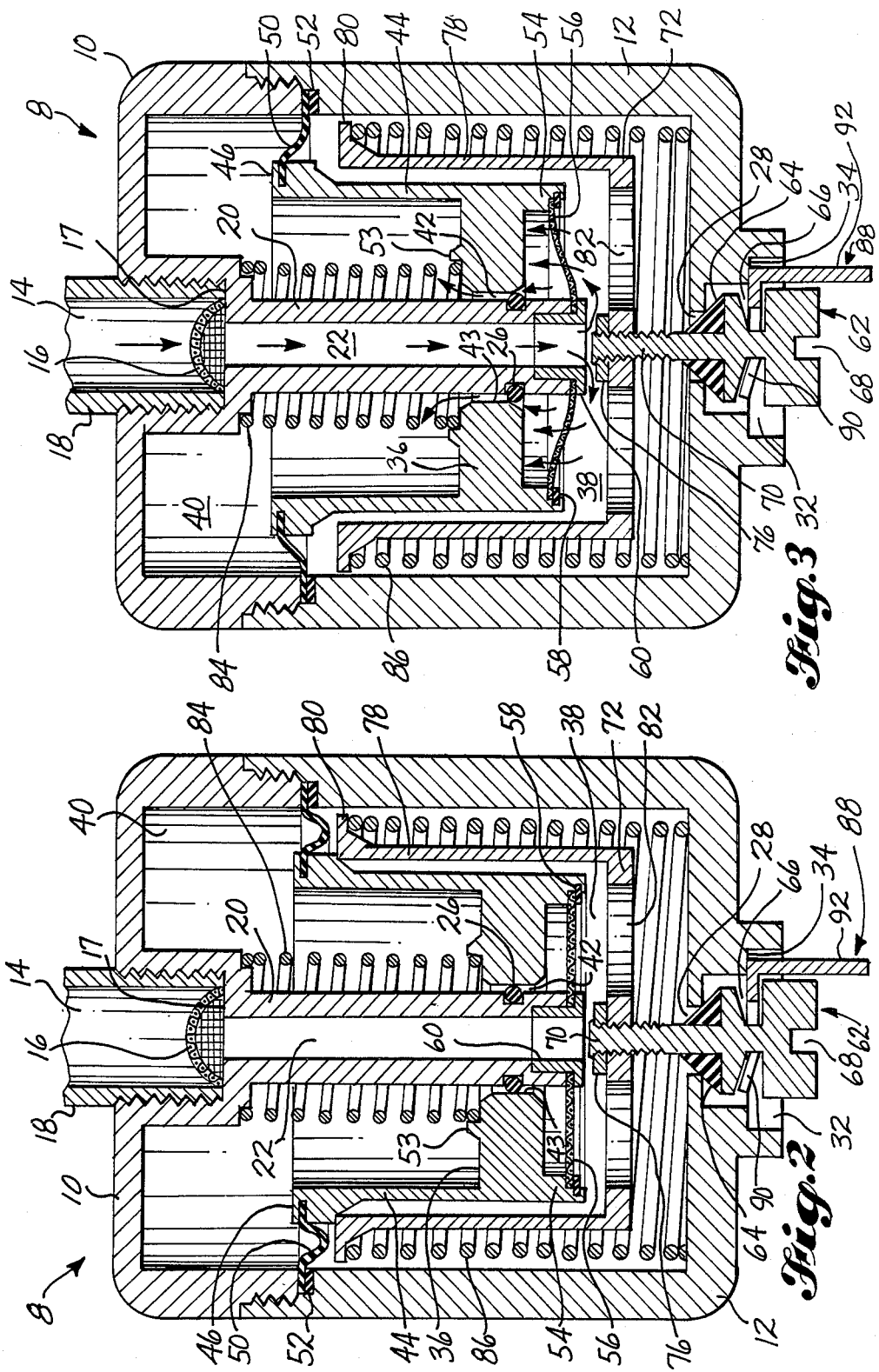

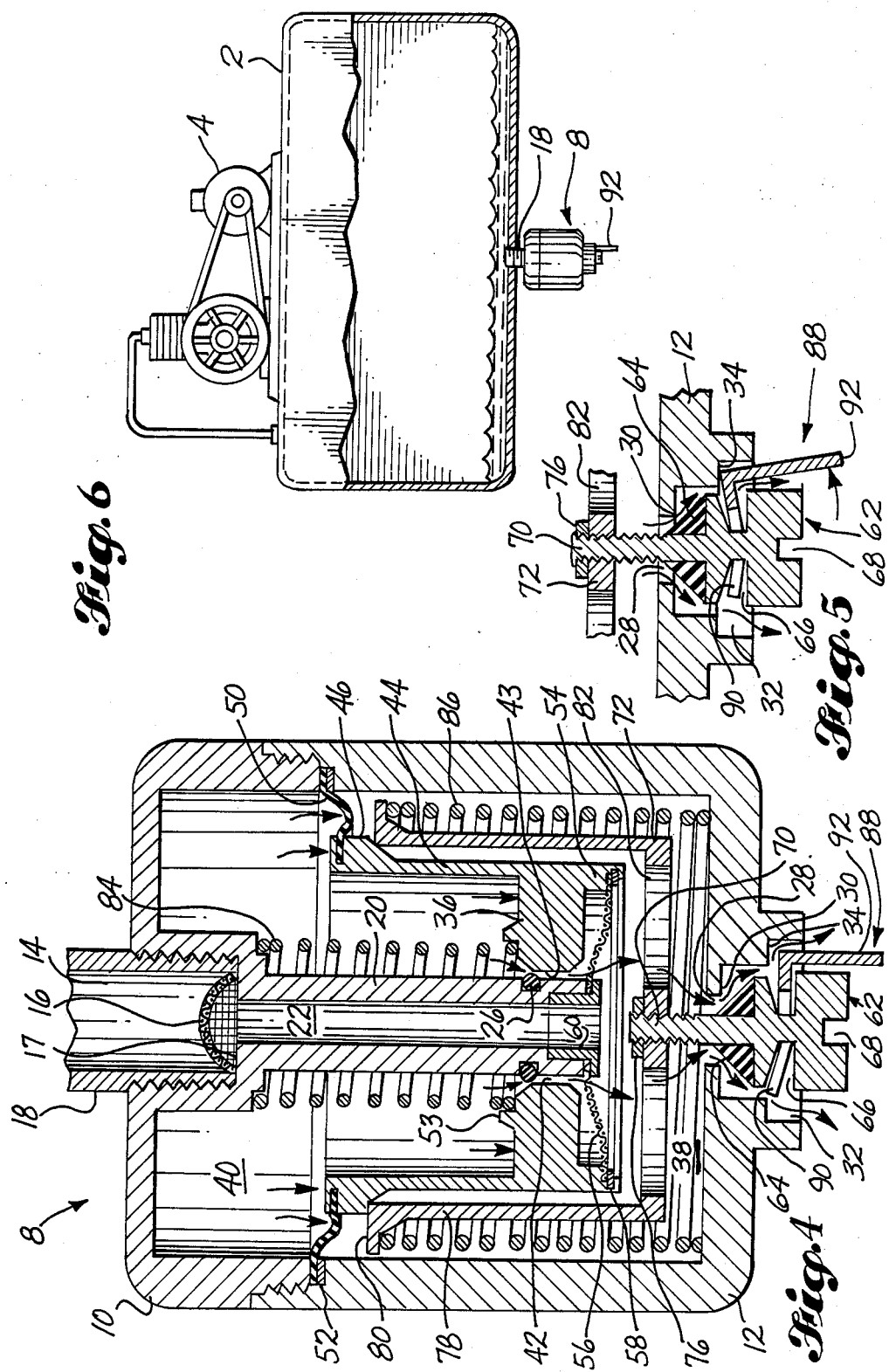

DRAIN VALVE

DESCRIPTION

1. Technical Field

This invention relates to automatic drain valves for draining liquid from reservoirs for pressurized gas end, more particularly, to such a valve in which a piston is moved in opposite axial directions past a fixed valve seat by pressure differentials between a sensing chamber and a main chamber that communicates with the reservoir and in which movement of the piston in one direction engages a valve element and moves it away from a drain opening.

2. Background Art

Compresses air systems in large trucks are generally provided with drain valves that are intended to keep the systems clean and dry. A major problem that has been encountered in connection with the drain valves currently in use is that the valves are frequently rendered inoperative because they are overly sensitive to contamination. In known valves, water from the system is flushed past the major, most sensitive seal. The water contains rust and other contaminating particles which have a deleterious effect on the functioning of the seal. When the seal no longer functions properly, the valve becomes inoperative.

In a typical type of drain valve currently being used in trucks, a single valve element is associated with two valve seats. The valve element seals against an upper seat to separate the valve into an upper chamber and a lower chamber and against a lower seat to close an outlet opening. Pressurized air and water from the reservoir enters the valve through an inlet into the upper chamber and moves past the upper valve seat into the lower sensing chamber. When there is a drop in pressure in the reservoir, the valve element is moved to seal it against the upper seat and open the outlet port. Water then flows from the lower sensing chamber through the outlet port.

A drain valve aimed primarily toward industrial applications is marketed by Dayton Electric Manufacturing Company of Chicago, Ill., under the trademark "Speedaire". This valve has a relatively high dome-shaped profile and operates in a pressure range of about 200 pounds per square inch gauge and above. Pressurized air and water from the compressed air system reservoir enter a lower chamber of the valve through an inlet, and the pressurized air acts on a check valve element carried by a piston-like member to move the valve element away from a seat formed on the member and open communication between the lower chamber and an upper chamber. The piston-like member remains stationary during this portion of the valve cycle. When there is a drop in pressure in the reservoir, a spring reseats the valve element, and the assembly comprising the piston-like member and the valve element moves downwardly under the action of a helper spring and the higher pressure in the upper chamber. As the assembly moves downwardly, a check valve pin engages the valve element to open communication between the upper and lower chambers, and the piston-like member engages a pin carried by a main valve element. Movement of the main valve element opens communication between the lower chamber and an outlet to drain water from the valve. The water is flushed out by the action of pressurized air flow from the upper chamber to the lower chamber. Equalization of pressure in the upper and lower chambers causes the assembly to return to its static position. The return of the assembly to its static position allows a first valve spring to reseat the main valve element and a second valve spring carried by the assembly to reseat the check valve element. This completes the drain valve cycle.

The Wagner Electric Corporation of Parsippany, N.J., manufactures another type of moisture ejection valve under the trademark "Wagner". The valve includes two valve seats both of which are exposed to contaminated water flowing through the valve. The valve is governor operated by pressurized air from a compressor. This pressurized air moves a diaphragm to move a valve element and open an inlet valve to admit water into a fluid chamber. The water flows through an exhaust valve from the fluid chamber to a lower chamber and then out an exhaust port.

U.S. Pat. No. 2,626,655, granted Jan. 27, 1953, to W. C. Trautman et al., discloses a valve and accumulator unit for use in a jet engine fuel supply system. In the operation of the unit, incoming fuel unseats a poppet of a check valve and moves into a lower chamber and upwardly into an upper chamber or accumulator. Line pressure in an outlet moves a piston to cut off flow from the lower chamber into the accumulator and open a path from the accumulator into the outlet. As it is moved by the line pressure, the piston first seats against a poppet valve element and then moves the element away from another seat to open the path from the accumulator to the outlet. The accumulator of the valve acts to store fuel which enters the valve from a pump during the initial operation of the engine. When the fuel is released from the accumulator into the outlet by movement of the piston, sufficient pressure has been built up to ensure that the first fuel discharged will be thoroughly atomized to promote prompt ignition.

Valves in which fluid pressure moves a piston and a valve element seated against the piston, the valve element engages a stop, and the piston continues to move to move the seat away from the valve element and open a passageway are disclosed in U.S. Pat. No. 2,041,906, granted May 26, 1936, to W. Czarnecki; U.S. Pat. No. 2,693,821, granted Nov. 9, 1954, to N. F. Cornelius; U.S. Pat. No. 2,986,159, granted May 30, 1961, to M. C. Snyder; U.S. Pat. No. 3,027,905, granted Apr. 3, 1962, to H. L. Dobrikin; and U.S. Pat. No. 3,311,124, granted Mar. 28, 1967, to R. W. Le Gates et al. Le Gates et al. disclose pressure regulating apparatus in which a spring moves the piston in the opposite direction when there is a pressure drop, and the movement of the piston moves the valve element downwardly to unseat it from a second valve seat spaced above the valve seat associated with the piston. Dobrikin similarly shows movement of the piston in the opposite direction by the action of a spring to move the valve element away from a seat. Snyder shows a valve element that is seated by pressure in one direction and is unseated in the opposite direction by a plunger carried by a diaphragm.

The patents and the known devices that are discussed above and the prior art that is discussed and/or cited in the patents should be studied for the purpose of putting the present invention into proper perspective relative to the prior art.

DISCLOSURE OF THE INVENTION

The subject of the invention is an automatic drain valve for draining liquid from a reservoir for pressurized gas. According to an aspect of the invention, the valve comprises a housing having an inlet opening, an outlet opening and means for communicating the inlet opening with the reservoir. A movable piston is positioned to divide the housing into a main chamber and a sensing chamber. Each of the inlet opening and the outlet opening communicates with the main chamber. A fixed valve seat is carried by the housing to sealingly engage the piston and close communication between the main chamber and the sensing chamber. A valve element is provided for closing the outlet opening. Biasing means biases the valve element into a closed position and the piston into sealing engagement with the valve seat. Actuating means moves the valve element into an open position in response to movement of the piston toward the main chamber. The piston is positioned to move toward the sensing chamber and out of engagement with the valve seat, to open communication between the main chamber and the sensing chamber, in response to higher pressure in the reservoir and the main chamber than in the sensing chamber; and to move toward the main chamber and out of engagement with the valve seat, to open communication between the main chamber and the sensing chamber and to move the valve element into its open position, in response to a drop in pressure in the reservoir and the main chamber.

A preferred feature of the invention is the provision of an axial opening extending through the piston and a stem fixed relative to the housing which carries the fixed valve seat and extends through the axial opening in the piston. This feature helps to simplify the structure of the valve to reduce its cost, and permits the sealing surface area of the valve seat to be minimized to help maintain its reliability. Another preferred feature is an inlet opening which comprises an axial passageway extending through the stem. This feature allows maximized internal concentricity of the valve parts to further reduce the cost of manufacturing the valve.

The actuating means preferably comprises an annular retainer attached to the valve element, and an abutment carried by the piston for engaging the retainer to move the retainer and the valve element. The biasing means preferably comprises a first spring having opposite ends abutting the housing and the retainer, respectively, to bias the valve element into a closed position, and a second spring having opposite ends abutting the housing and the piston, respectively, to bias the piston toward the main chamber. The preferred arrangement of the actuating means and the biasing means provides efficient and reliable functioning of the valve and permits the maintenance of maximized internal concentricity of the valve parts. In addition, the arrangement facilitates incorporation into the valve of means for manually draining the reservoir. When such manual draining means is provided, it preferably comprises a manual drain level having a first end that engages the valve element and a second opposite end positioned to be engaged by an operator to pivot the lever and move the valve element into an open position. This preferred manual draining means has the advantages of being very simple in structure, reliable in operation, and easy to operate.

The valve of the invention solves the problems discussed above in connection with currently available drain valves for vehicle compressed air systems. The valve has a reduced sensitivity to contamination and, thus, maintains its reliability over extended periods of operation. In the valve, both the inlet opening and the outlet opening communicate with the main chamber, and dirty water flowing into the valve from the reservoir does not pass the sensitive seal between the main chamber and the sensing chamber. Therefore, this seal is substantially isolated from contaminants to minimize the sensitivity of the valve's operation to the presence of contaminants in the water drained from the reservoir.

The operation of the valve is fully automatic and does not require any external power source or sensing line. The operation of the valve provides a cascading flushing action which results in thorough removal of liquid and contaminants from the system and from the valve. The expulsion of the water when there is a system pressure drop minimizes the effect of the expulsion on the system. The structure and functioning of the valve require only a minimum number of moving parts. The combination of a piston which is moved in opposite directions by pressure differentials and a fixed valve seat provides, by the movement of a single moving part, fully automatic opening of communication between the main chamber and the sensing chamber in both major phases of the valve cycle.

The valve is readily adaptable to the needs of compressed air systems in vehicles. The valve may be made very sensitive to drops in pressure in the system and, at the same time, be dimensioned to have a low profile so that it may be accommodated in areas where space is limited. The valve also operates well in the pressure range of 90 to 120 pounds per square inch gauge which is typical of vehicle compressed air systems. Finally, the valve may be mounted either horizontally or vertically depending on the availability of space around the reservoir. In short, the valve of the invention provides an inexpensive, reliable, durable, and versatile means for maintaining vehicle compressed air systems in a clean and dry condition.

These and other advantages and features will become apparent from the detailed description of the best modes for carrying out the invention that follows.

BRIEF DESCRIPTION OF THE DRAWINGS

In the drawings, like element designations refer to like parts throughout, and:

FIG. 1 is an exploded pictorial view of a first preferred embodiment of the valve.

FIG. 2 is a sectional view of the valve shown in FIG. 1 in a static position.

FIG. 3 is like FIG. 2 except that it shows the response of the valve to higher pressure in the reservoir than in the sensing chamber.

FIG. 4 is like FIGS. 2 and 3 except that it shows the response of the valve to a drop in pressure in the reservoir.

FIG. 5 is a fragmentary sectional view illustrating the operation of the manual drain lever of the valve shown in FIGS. 1-4.

FIG. 6 is an elevational view of a compressed air system reservoir with the valve shown in FIGS. 1-5 installed thereon, with parts shown in section.

BEST MODES FOR CARRYING OUT THE INVENTION

The drawings show three embodiments of a valve 8, 8', 8" that are constructed according to the invention and that also constitute the best modes for carrying out the invention currently known to the applicant. FIG. 6 illustrates the use of the valve 8 in connection with a type of compressed air system that is used in large trucks and has a reservoir 2 and a compressor 4. It is anticipated that the primary application of the valve of the invention will be in truck systems of the type illustrated in FIG. 6. However, it is of course to be understood that the valve of the invention may also be used to advantage for draining liquid from reservoirs for presurized gas in other types of systems.

Figure 7:
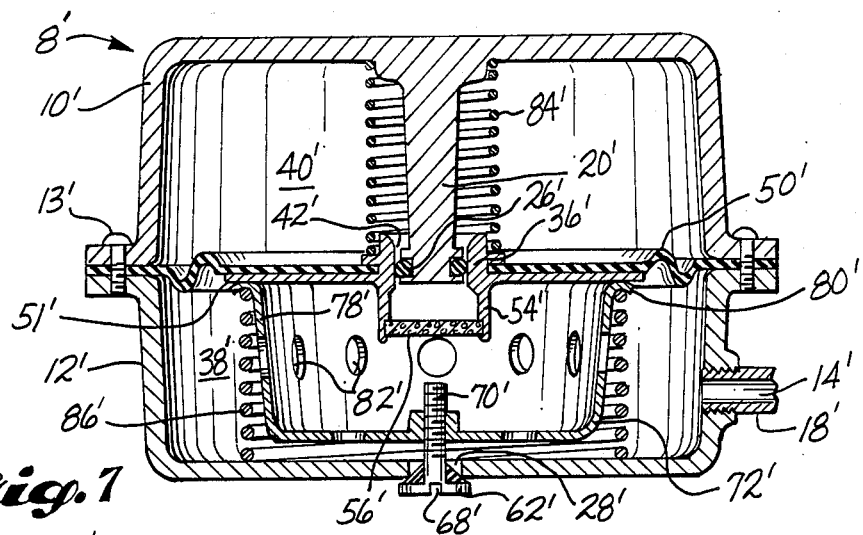
FIGS. 7-9 are like FIGS. 2-4 except that they show a second preferred embodiment of the valve.
Figure 8:
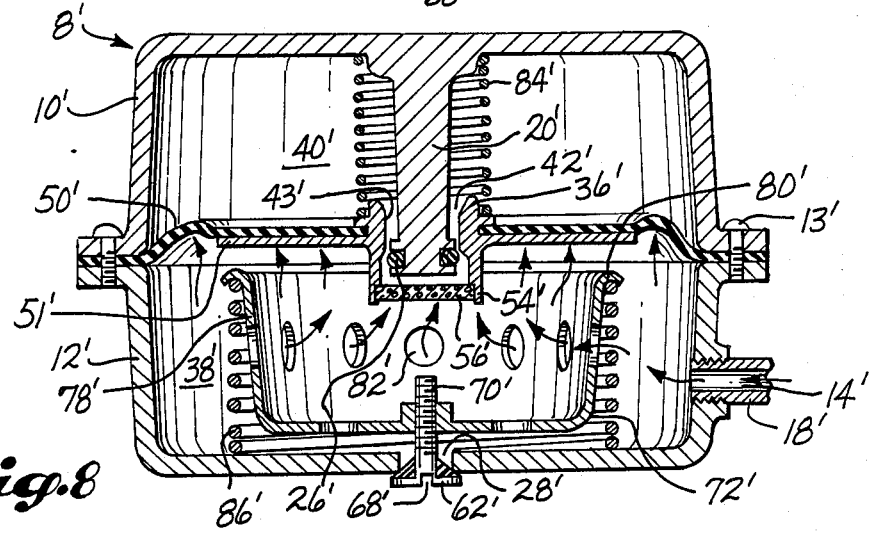
Figure 9:
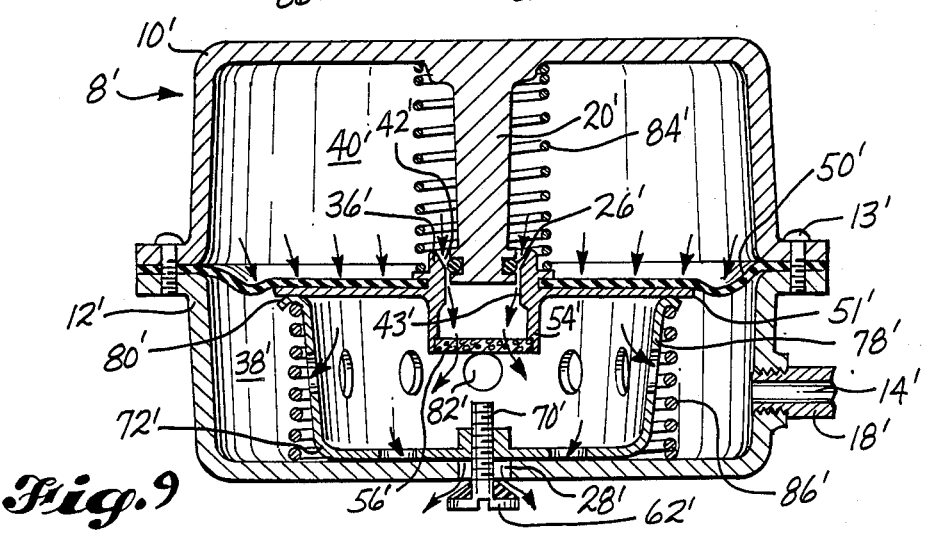
Figure 10:
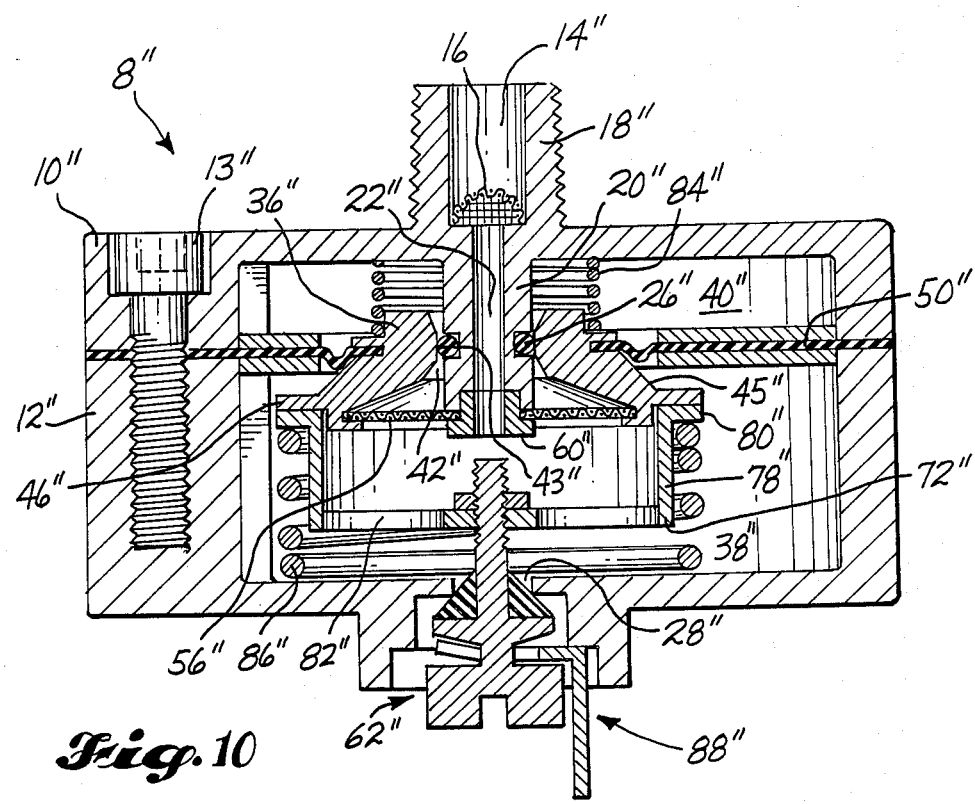
FIG. 10 is like FIGS. 2 and 7 except that it shows a third preferred embodiment of the valve.

A first preferred embodiment of the valve 8 is shown in FIGS. 1-6. A second preferred embodiment is shown in FIGS. 7-9. A third preferred embodiment is shown in FIG. 10. The elements of the valve 8 shown in FIGS. 1-6 are designated by reference characters having a numerical portion only. The elements of the valve 8' shown in FIGS. 7-9 are designated by reference characters having a numerical portion with a prime symbol. The reference characters designating the elements of the valve 8" shown in FIG. 10 have a numerical portion with a double prime symbol. Similar parts with substantially the same functions are designated by reference characters with the same numerical portion in FIGS. 1-10.

Figure 11:
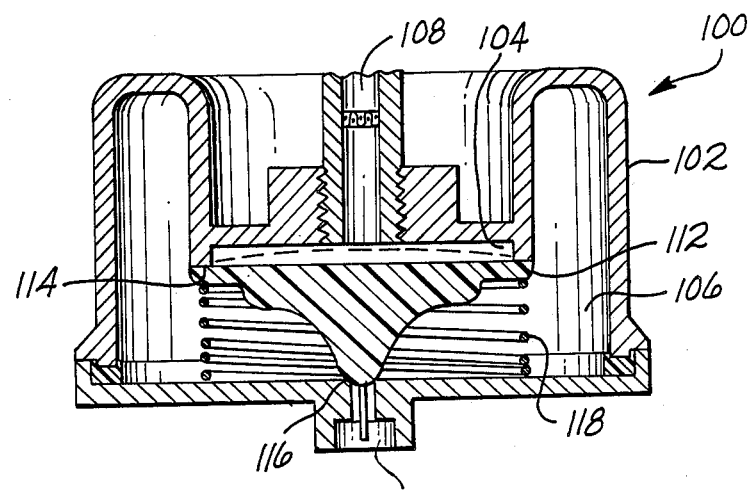
FIG. 11 is a sectional view of a known type of drain valve structure, showing the valve in a static position.

Before discussing the preferred embodiments of the valve of the invention, it is useful to consider the type of valve which is currently in common use in vehicle compressed air systems. Such a valve is shown in partially schematic form in FIG. 11. The valve 100 has a housing 102 which is divided into an inlet chamber 104 and a sensing chamber 106. An inlet 108 is formed in the housing 102 and communicates with the inlet chamber 104. An outlet 110 is formed in the housing 102 and communicates with the sensing chamber 106. The valve 100 has a movable valve element 112 which seats against an upper seat 114 formed by the housing and a lower seat 116 formed by the outlet 110. A spring 118 biases the valve element 112 into sealing engagement with the upper seat 114.

In the operation of the valve 100, pressurized air and water from the reservoir enter the inlet chamber 104 through the inlet 108 and move past the upper seat 114 into the sensing chamber 106. The pressure of the entering air is higher than the pressure in the sensing chamber 106 so that the perimeter of the valve element 112 bends an amount sufficient to unseat it from the upper seat 114 and allow the passage of fluid from the inlet chamber 104 to the sensing chamber 106. When there is a drop in pressure in the reservoir, the higher pressure in the sensing chamber 106 reseats the valve element 112 against the upper seat 114 and distorts the valve element 112, as indicated in broken lines in FIG. 11, to unseat the valve element 112 from the lower seat 116. Water then flows from the sensing chamber 106 through the outlet 110. The structuring of the valve 100 so that the inlet 108 communicates with one chamber and the outlet 110 communicates with another chamber makes it necessary for all dirty water entering the valve 100 to pass the critical seal between the two chambers 104, 106. This has the negative effects on the functioning of the valve 100 discussed above. In particular, the upper valve seat 114 is exposed to contaminants which tend to destroy the seal between the seat 114 and the valve element 112 and, thereby, render the valve 100 inoperative.

The valve 8 shown in FIGS. 1-6 has a housing 10, 12 with an upper portion 10 and a lower portion 12 which are threadedly secured together. An inlet opening 14 is formed in the upper housing portion 10, and an outlet opening 28 is formed in the lower housing portion 12. A stem 20 exends axially inwardly from the inlet opening 14 and defines an axial passageway 22. The stem 20 is formed integrally with the upper housing portion 10. The upper portion of the stem 20 has an enlarged diameter and forms an internal radial shoulder 17. A screen 16 is positioned on the shoulder 17 to filter fluid entering the valve 8 through the inlet opening 14. A coupling 18 is threadedly connected to the inlet opening 14 and the upper enlarged diameter portion of the stem 20 to provide a means for attaching the valve 8 to the reservoir 2 of a compressed air system.

The interior of the valve housing 10, 12 is divided into a main chamber 38 and a sensing chamber 40 by a piston 36. A fixed valve seat 26 is carried by the stem 20 near its inner end for sealingly engaging the piston 36 and closing communication between the main chamber 38 and the sensing chamber 40. As shown in FIGS. 1-4, the valve seat is preferably formed by an O-ring 26 received into an annular circumferential groove 24 on the stem 20. The stem 20 extends through an axial opening 42 in the piston 36. The opening 42 is defined by a sealing surface 43. When the valve is in the static position shown in FIG. 2, the O-ring 26 sealingly engages the surface 43.

The piston 36 has an upper annular axial extension 44 which terminates in a radial flange 46. An annular groove 48 is formed in the flange 46 for receiving the inner periphery of a flexible annular diaphragm 50. The outer periphery of the diaphragm 50 is secured between the upper and lower housing parts 10, 12. A sealing ring 52 is provided between the lower housing portion 12 and the diaphragm 50. The diaphragm 50 cooperates with the piston 36 to separate the valve's interior into the main chamber 38 and the sensing chamber 40 and allows axial movement in either direction of the piston 36.

The piston 36 also has a lower annular axial extension 54. An annular groove 55 is formed in the inner periphery of the extension 54. The outer periphery of an annular screen 56 is received into the groove 55. A retaining ring 58 secures the screen 56 to the extension 54. The inner periphery of the screen 56 is secured to the inner end of the stem 20 by a T-shaped retainer 60. The screen 56 is sufficiently flexible to allow relative movement between the piston 36 and the stem 20.

The valve 8 has a valve element 62 for closing the outlet opening 28. The element 62 has an elastomeric frustoconical surface 64 which engages a valve seat 30 formed by the outlet opening 28. The valve element 62 is held in sealing engagement with the seat 30 by an annular, generally hat-shaped retainer 72. The valve element has a threaded axial extension 70 which extends inwardly into the main chamber 38 of the valve 8. The extension 70 is threadedly received into a suitable opening 74 in the retainer 72. A nut 76 secures the extension 70 relative to the retainer 72. The outer radial end surface of the element 62 has a slot 68 formed therein for receiving a tool to adjust the position of the element 62 relative to the retainer 72 and thereby adjust the pressure differential required to move the element 62 away from the seat 30.

The retainer 72 has a cylindrical axial extension 78 that terminates in a radial flange 80. The flange 80 is engaged by the flange 46 carried by the axial extension 44 of the piston 36. The flange 80 also provides an abutment for a spring 86 described further below. Flow openings 82 are provided in the bottom portion of the retainer 72 to permit flow of fluid throughout the main chamber 38, in which the retainer 72 is located.

The valve 8 is provided with biasing means comprising an upper spring 84 and a lower spring 86. The upper end of the lower spring 86 abuts the flange 80 of the retainer 72, and its lower end abuts an inner wall surface of the lower housing portion 12. This positioning of the spring 86 biases the valve element 62 into a closed position in which it sealingly engages the seat 30. The upper end of the upper spring 84 abuts a radial surface formed by the enlarged diameter portion of the stem 20, and its lower end abuts the piston 36. An annular ridge 53 is formed on the piston 36 to maintain the lower end of the spring 84 in position. The springs 84, 86 bias the piston 36 into its static position shown in FIG. 2 in which its sealing surface 43 sealingly engages the fixed seat 26.

The valve 8 is also provided with means for manually draining the reservoir. As shown in FIGS. 1-5, this means includes a generally L-shaped drain lever 88. A first end of the lever formed by its upper forked leg 90 engages the valve element 62. The second opposite end of the lever 88 formed by the other leg 92 extends outwardly from the valve 8 to position it to be engaged by an operator. The valve element 62 is provided with an annular radial groove 66 into which the two arms of the forked leg 90 of the lever 88 are received. The arms of the forked leg 90 straddle the narrow neck portion of the valve element 62 surrounded by the groove 66 to engage the valve element 62. The housing portion 12 forms a recess 32 outwardly of the seat 30 for accommodating the lever 88. The recess 32 has a stepped configuration to form a shoulder 34 against which the lever 88 is pivoted. FIG. 5 illustrates the operation of the manual lever 88. An operator simply applies a force on the projecting leg 92 of the lever 88 in the direction indicated by the arrow in FIG. 5. This pivots the lever 88 to in turn move the valve element 62 downwardly away from the seat 30 to allow outward flow through the outlet opening 28.

The operation of the valve 8 is illustrated in FIGS. 2-4. FIG. 2 shows the static position of the valve 8 in which the pressure in the main chamber 38 is the same as the pressure in the sensing chamber 40. FIG. 3 illustrates the movement of the valve parts in response to higher pressure in the reservoir 2 and the main chamber 38 than in the sensing chamber 40. Pressurized air flows from the reservoir 2 through the coupling 18 and the inlet opening 14 past the screen 16 and down through the passageway 22 formed by the stem 20 into the main chamber 38. The pressurized air exerts an upward force on the piston 36, as indicated by the arrows in FIG. 3. The differential pressure on the piston 36 moves the piston 36 upwardly toward the sensing chamber 40. The upward movement of the piston 36 moves the sealing surface 43 out of engagement with the fixed valve seat 26. This allows pressurized air to flow from the main chamber 38 into the sensing chamber 40 through the axial opening 42 in the piston 36. The screen 56 helps prevent contaminants from contacting the sensitive O-ring 26 and sealing surface 43. As the piston 36 moves upwardly, its flange 46 moves out of engagement with the retainer 72. When the pressure in the main chamber 38 and the sensing chamber 40 has equalized, the spring 84 moves the piston 36 downwardly toward the main chamber 38 and the sealing surface 43 into sealing engagement with the O-ring 26. This completes the priming phase of the valve cycle illustrated in FIG. 3.

FIG. 4 illustrates the flushing phase of the valve cycle. This phase occurs in responses to a drop in pressure in the reservoir 2 and the main chamber 38. When there is such a pressure drop, the higher pressure in the sensing chamber 40 causes the piston 36 to move downwardly as indicated in FIG. 4. The downward movement of the piston 36 causes the piston flange 46 to engage the retainer 72 and move the retainer 72 downwardly against the force of the spring 86. The downward movement of the retainer 72 in turn causes downward movement of the valve element 62 to open the outlet opening 28. The movement of the piston 36 toward the main chamber 38 also moves the sealing surface 43 out of engagement with the O-ring 26 to open communication between the sensing chamber 40 and the main chamber 38. This allows pressurized air to flow from the sensing chamber 40 through the axial opening 42 in the piston 36 into the main chamber 38. The air then flows from the main chamber 38 out of the valve 8 through the outlet opening 28, as illustrated in FIG. 4.

The flow of pressurized air from the sensing chamber 40 into the main chamber 38 and out through the outlet 28 causes a cascading, flushing action to thoroughly expel liquid and contaminants from the valve 8. The self-cleaning action of the valve 8 is further enhanced by the action of the downward flow through the screen 56, which tends to dislodge particles that have been trapped by the screen 56. When the pressure in the sensing chamber 40 and the main chamber 38 has been equalized, the spring 86 returns the retainer 72 to the static position shown in FIG. 2. The movement of the retainer 72 automatically returns the piston 36 to its static position also shown in FIG. 2. this completes the valve cycle.

A second preferred embodiment of the valve 8' is shown in FIGS. 7-9. The valve 8' has a housing 10', 12' having an upper portion 10' and a lower portion 12'. The two housing portions 10', 12' are secured together by screws 13'. An inlet opening 14' and an outlet opening 28' are formed in the lower housing portion 12'. A coupling 18' is threadedly connected to the inlet opening 14' for connecting the valve 8' to a compressed air system reservoir. A stem 20', integrally formed with the upper housing part 10', extends axially inwardly from the top of the housing portion 10'. The stem 20' carries an O-ring 26' which forms a fixed valve seat in the same manner that the O-ring 26 forms a seat in the first embodiment shown in FIGS. 1-6.

The valve 8' is provided with a piston 36' that separates the interior of the valve housing 10', 12' into a main chamber 38' and a sensing chamber 40'. An axial opening 42' extends through the center of the piston 36' and is bounded by a sealing surface 43' which sealingly engages the O-ring 26' when the valve 8' is in the static position shown in FIG. 7. The piston 36' has an annular radial extension 51' which helps to separate the main chamber 38' and the sensing chamber 40' and to support a diaphragm 50'. The inner periphery of the diaphragm 50' is attached to the center portion of the piston 36', and the outer periphery of the diaphragm 50' is secured between the housing parts 10', 12'. The diaphragm 50' allows axial movement of the piston 36' as described above in connection with the embodiment of FIGS. 1-6. The piston 36' has a lower axial extension 54' which provides a means for mounting a screen 56'.

The valve 8' is also provided with a valve element 62'. The element 62' has a threaded extension 70' which is engaged by a retainer 72'. A tool slot 68' in the outer head of the valve element 62' permits adjustment of the valve opening pressure, as described above. The retainer 72' has an axially inwardly extending, generally cylindrical extension 78'. The extension 78' terminates in an arcuate flange 80' which forms an abutment for a spring 86'. The spring 86' biases the retainer 72' axially inwardly and the valve element 62' into a position in which it closes the outlet opening 28'. Flow openings 82' are formed in the retainer 72'. An upper spring 84' biases the piston 36' toward the main chamber 38' and into engagement with the retainer flange 80'.

As can be seen in FIGS. 7-9, which correspond to FIGS. 2-4, the operation of the second embodiment of the valve 8' is essentially the same as the operation of the valve 8 described above.

FIG. 10 shows a third preferred embodiment of the valve 8". This embodiment is currently the most preferred embodiment for use in vehicle compressed air systems because of its relatively low profile. FIG. 10 illustrates the static position of the valve 8". The operation of the valve 8" is essentially the same as the operation of the first embodiment shown in FIGS. 1-6.

The valve 8" has a housing 10", 12" which includes an upper portion 10" and a lower portion 12". The upper end lower portions 10" and 12" are secured together by at least one screw 13". Preferably, the housing portions 10", 12" are made from a self-tapping material to reduce the cost of manufacture of the housing 10", 12" by eliminating the need for machining threads on the housing portions 10", 12" for the screw 13".

Like the embodiment shown in FIGS. 1-6, the valve 8" shown in FIG. 10 has an inlet opening 14" formed in the upper housing portion 10" and an outlet opening 28" formed in the lower housing portion 12". A coupling 18" and a stem 20" are integrally formed with the upper housing part 10". The stem 20" extends axially inwardly from the top of the housing portion 10" and defines an axial passageway 22". The passageway 22" communicates with the passageway through the coupling 18". At the intersection of the stem passageway 22" and the passageway in the coupling 18", a shoulder is formed for supporting a filtering screen 16".

As in the other two embodiments, the stem 20" carries a fixed valve seat formed by an O-ring 26". The O-ring 26" sealingly engages a sealing surface 43" formed on a piston 36". The sealing surface 43" defines an axial opening 42" extending through the piston 36". The stem 20" projects through this opening 42". The piston 36" divides the interior of the housing 10", 12" into a main chamber 38" and a sensing chamber 40". A diaphragm 50" is secured to the piston 36" and between the housing portions 10", 12" to seal the separation between the chambers 38", 40" and allow axial movement of the piston 36", as described above. The piston 36" has a radially outwardly and axially downwardly extending projection 45" which terminates in an annular radial flange 46". The projection 45" provides a means for securing the outer periphery of a screen 56". The inner periphery of the screen 56" is secured to the lower end of the stem 20" by a T-shaped retainer 60".

The valve 8" has a valve element 62" which is attached to a hat-shaped retainer 72". The inward axial extension 78" of the retainer 72" terminates in a radial flange 80". The lower surface of the flange 80" forms an abutment for a spring 86". The upper surface of the flange 80" is engaged by the radial flange 46" of the lower projection 45" of the piston 36". The retainer 72" has suitable flow openings 82". A spring 84" biases the piston 36" toward the main chamber 38" and the piston flange 46" into engagement with the retainer flange 80". The valve 8" is preferably provided with a manual drain lever 88" of the type described above in connection with the first embodiment shown in FIGS. 1-6.

Throughout the description of the valve of the invention, the terms "upper", "lower", "upward", "downward", and the like have been used. These terms have been used for the purposes of simplifying the description and illustrating the typical use attitude of the valve shown in the drawings. The use of these terms and the illustration of the typical use attitude in the drawings are not intended to in any way limit the scope of the invention. It is intended to be understood that the valve of the invention may be used in a variety of use attitudes other than the attitude shown in the drawings. For example, the valve might be mounted in a horizontal position.

It will be obvious to those skilled in the art to which this invention is addressed that the invention may be used to advantage in a variety of situations. Therefore, it is also to be understood by those skilled in the art that various modifications and omissions in form and detail may be made without departing from the spirit and scope of the invention as defined by the following claims.

What is claimed is:

1. An automatic drain valve for draining liquid from a reservoir for pressurized gas, comprising:
    a housing having an inlet opening, an outlet opening, and means for communicating the inlet opening with the reservoir;
    a movable piston positioned to divide the housing into a main chamber and a sensing chamber, each of said inlet opening and said outlet opening communicating with the main chamber;
    a fixed valve seat carried by the housing to sealingly engage the piston and close communication between the main chamber and the sensing chamber;
    a valve element for closing the outlet opening;
    biasing means for biasing the valve element into a closed position and the piston into sealing engagement with said valve seat; and
    actuating means for moving the valve element into an open position in response to movement of the piston toward the main chamber;
    said piston being positioned to move toward the sensing chamber and out of engagement with said valve seat, to open communication between the main chamber and the sensing chamber, in response to higher pressure in the reservoir and the main chamber than in the sensing chamber; and to move toward the main chamber and out of engagement with said valve seat, to open communication between the main chamber and the sensing chamber and to move the valve element into said open position, in response to a drop in pressure in the reservoir and the main chamber.

2. A valve as described in claim 1, in which the piston has an axial opening extending therethrough; and the fixed valve seat is carried by a stem fixed relative to the housing, said stem extending through said axial opening.

3. A valve as described in claim 2, in which the inlet opening comprises an axial passageway extending through the stem.

4. A valve as described in claim 1, in which the actuating means comprises an annular retainer attached to the valve element, and an abutment carried by the piston for engaging the retainer to move the retainer and the valve element.

5. A valve as described in claim 4, in which the biasing means comprises a first spring having opposite ends abutting the housing and the retainer, respectively, to bias the valve element into a closed position; and a second spring having opposite ends abutting the housing and the piston, respectively, to bias the piston toward the main chamber.

6. A valve as described in claim 2, in which the actuating means comprises an annular retainer attached to the valve element, and an abutment carried by the piston for engaging the retainer to move the retainer and the valve element.

7. A valve as described in claim 6, in which the biasing means comprises a first spring having opposite ends abutting the housing and the retainer, respectively, to bias the valve element into a closed position; and a second spring having opposite ends abutting the housing and the piston, respectively, to bias the piston toward the main chamber.

8. A valve as described in claim 3, in which the actuating means comprises an annular retainer attached to the valve element, and an abutment carried by the piston for engaging the retainer to move the retainer and the valve element.

9. A valve as described in claim 8, in which the biasing means comprises a first spring having opposite ends abutting the housing and the retainer, respectively, to bias the valve element into a closed position; and a second spring having opposite ends abutting the housing and the piston, respectively, to bias the piston toward the main chamber.

10. A valve as described in claim 1, further comprising a manual drain lever having a first end that engages the valve element, and a second opposite end positioned to be engaged by an operator to pivot the lever and move the valve element into an open position.

11. A valve as described in claim 4, further comprising a manual drain lever having a first end that engages the valve element, and a second opposite end positioned to be engaged by an operator to pivot the lever and move the valve element into an open position.

12. A valve as described in claim 5, further comprising a manual drain lever having a first end that engages the valve element, and a second opposite end positioned to be engaged by an operator to pivot the lever and move the valve element into an open position.

13. A valve as described in claim 6, further comprising a manual drain lever having a first end that engages the valve element, and a second opposite end positioned to be engaged by an operator to pivot the lever and move the valve element into an open position.

14. A valve as described in claim 7, further comprising a manual drain lever having a first end that engages the valve element, and a second opposite end positioned to be engaged by an operator to pivot the lever and move the valve element into an open position.

15. A valve as described in claim 8, further comprising a manual drain lever having a first end that engages the valve element, and a second opposite end positioned to be engaged by an operator to pivot the lever and move the valve element into an open position.

16. A valve as described in claim 9, further comprising a manual drain lever having a first end that engages the valve element, and a second opposite end positioned to be engaged by an operator to pivot the lever and move the valve element into an open position.

* * * * *